United States Patent [19]

Ernst et al.

[11] 4,388,758
[45] Jun. 21, 1983

[54] DIGITAL ELECTRICAL ANGLE-MEASURING DEVICE

[75] Inventors: Alfons Ernst; Hans-Rudolf Kober, both of Traunreut, Fed. Rep. of Germany

[73] Assignee: Johannes Heidenhain GmbH, Traunreut, Fed. Rep. of Germany

[21] Appl. No.: 238,471

[22] Filed: Feb. 26, 1981

[30] Foreign Application Priority Data

Mar. 5, 1980 [DE] Fed. Rep. of Germany ....... 3008396

[51] Int. Cl.³ .............................................. G01B 7/30
[52] U.S. Cl. .................................... 33/1 PT; 324/208
[58] Field of Search ............... 33/1 N, 1 PT; 324/208

[56] References Cited

U.S. PATENT DOCUMENTS

| | | | |
|---|---|---|---|
| 3,162,805 | 12/1964 | Robertson | 324/208 |
| 3,202,948 | 8/1965 | Farrand | 336/115 |
| 3,355,806 | 12/1967 | Brook | 33/1 N |
| 3,786,459 | 1/1974 | Berger | 324/208 |

FOREIGN PATENT DOCUMENTS

| | | |
|---|---|---|
| 1267433 | 5/1968 | Fed. Rep. of Germany . |
| 2306752 | 11/1974 | Fed. Rep. of Germany . |
| 158292 | 10/1978 | Netherlands .......................... 33/1 N |
| 602770 | 4/1978 | U.S.S.R. ............................. 33/1 PT |
| 773426 | 10/1980 | U.S.S.R. ............................. 33/1 PT |

OTHER PUBLICATIONS

Brochure entitled, "Inductosyn", published by Dr. Johannes Heidenhain GmbH, dated Jul. 1978.

*Primary Examiner*—Richard R. Stearns
*Attorney, Agent, or Firm*—Hume, Clement, Brinks, Willian & Olds, Ltd.

[57] ABSTRACT

An inductive measuring device comprises a rotor and a stator, each of which has an electrical conductor mounted thereon. Opposed grooves are formed in the conductor side of the stator and the rotor, the slip rings and contact brushes are mounted in respective grooves such that both the slip rings and the contact brushes are mounted internally between the rotor and the stator, thereby protecting the slip ring and brushes from damage and fouling and reducing the size of the measurement device and the need for external adjustment.

11 Claims, 7 Drawing Figures

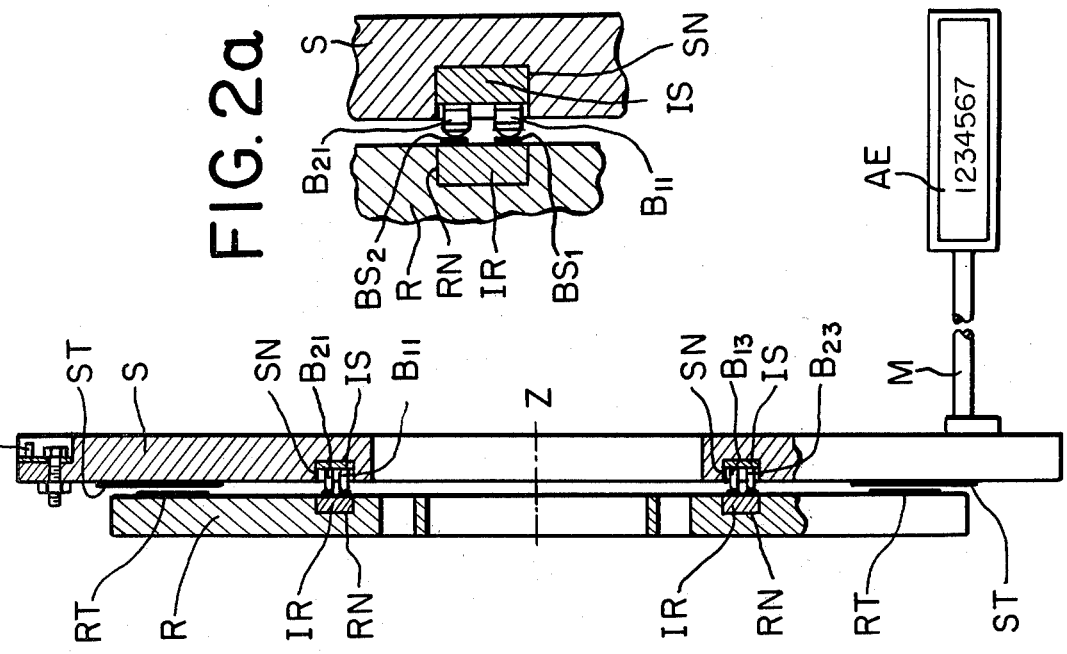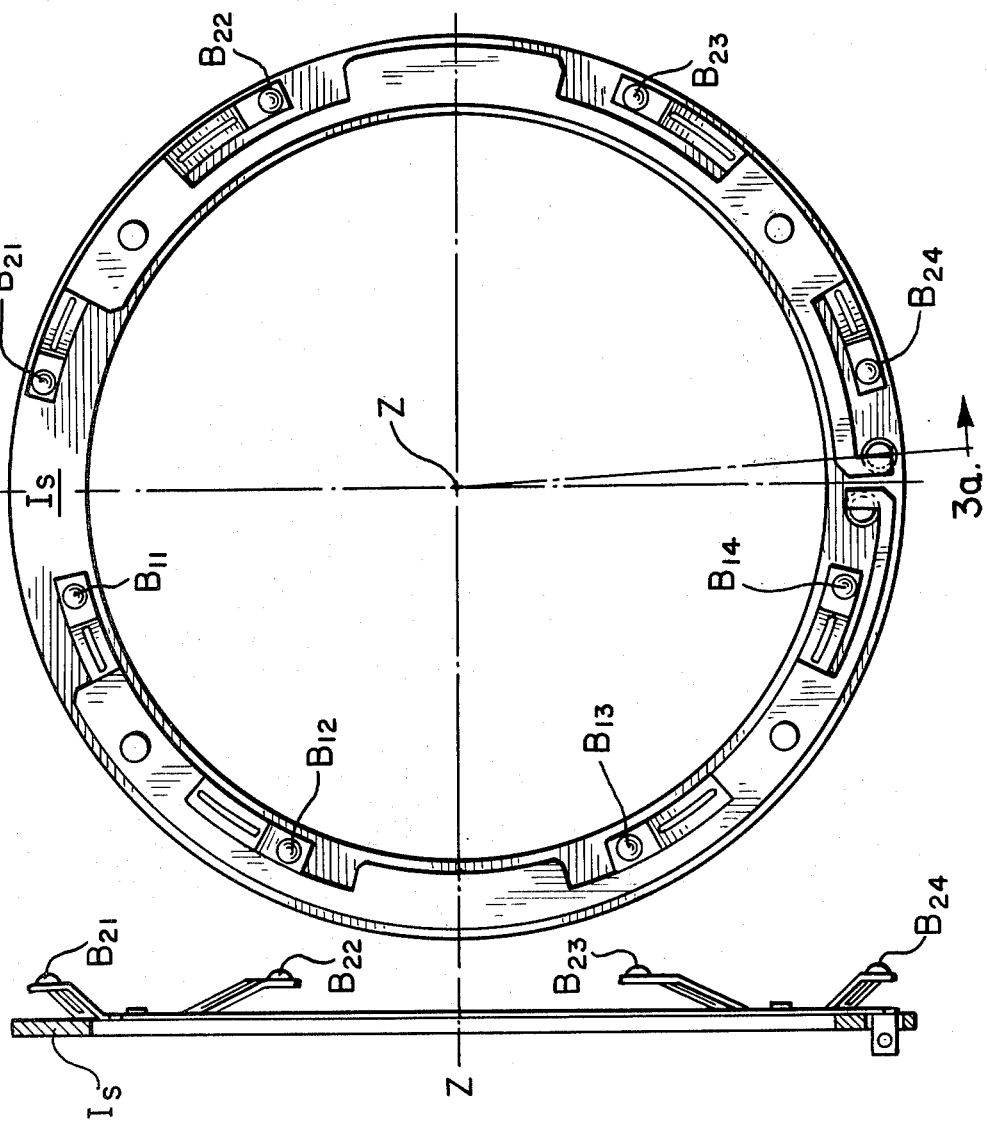

DIGITAL ELECTRICAL ANGLE-MEASURING DEVICE

BACKGROUND OF THE INVENTION

This invention relates to improvements in digital electrical angle-measuring devices of the type comprising a stator having an electrically conductive measuring division conductor mounted on one side thereof, and a rotor having an electrically conductive scanning conductor mounted on one side thereof, wherein the rotor is mounted to move relative to the stator and the division conductor is positioned adjacent to and separated by a gap from the scanning conductor.

Angle-measuring devices of the type described above are known to the art. For example, in West German Pat. No. 2 306 752 there is described a capacitance operated length- or angle-measuring device in which a voltage is applied by means of a fixed electrical contact to the measuring device and an output voltage, which varies as a function of the measurement, is picked up by means of a slip contact. Both the fixed contact and the slip contact are positioned on the outer surfaces of the relatively movable components of the measuring device.

In addition, the corporate brochure "Inductosyn" published by Dr. Johannes Heidenhain GmbH, dated July 1978, discloses inductive angle-measuring devices of several different types, including trailing cable devices suitable for only limited angles of rotation between the rotor and the stator, slip ring devices having external contacting elements as well as external contacting strips, as well as transformer devices having internally located transformers for transmitting the measuring voltage from the rotor to the stator.

Furthermore, in West German DT-AS No. 1 267 433 there is also described an inductive measuring device of the transformer type, in which reference is made to the disadvantage of slip rings and brushes, without specifically specifying these disadvantages.

The disadvantages of slip rings and brushes of the prior art relate particularly to the expensive manner of attachment and installation. Generally brushes and slip rings are mounted externally in prior art measuring devices, an arrangement which requires separate mounting fixtures for either the brushes or the slip rings, thereby increasing the expense of adjustment which is required during the assembly of the measuring device at the place of use. In particular, the brushes or contact members must be positioned accurately with respect to the slip rings for the measuring device to function properly. In addition, because it has in the past been common to mount both the slip rings and the contact members on the outer surfaces of the rotor of the measuring device, it has generally been the case that a greater amount of installation space is required when slip ring type measuring devices are used as compared either with trailing cable or transformer type devices.

SUMMARY OF THE INVENTION

The present invention is directed to an improved digital electrical angle-measuring device which to a large extent overcomes the disadvantages of the slip ring type of measuring device, while providing significantly greater transmission factors than the transformer type of measuring devices of the prior art.

According to this invention a measuring device of the type described above comprises at least one contact strip, such as an annular slip ring, for example, which is mounted to the conductor side of either the rotor or the stator, and at least one contact element, such as a contact brush, for example, which is mounted to the conductor side of the other component of the measuring device, such that the contact element is positioned to contact the contact surface electrically, thereby providing dependable electrical contact between the rotor and the stator. In alternate embodiments of this invention the contact strip can be positioned on either the rotor or the stator. The dependent claims which follow serve to point out further advantageous features of the present invention.

The present invention provides a number of important advantages. The space requirement for the measuring device of the present invention is no greater than that for measuring devices of the transformer type. In addition, the contact strip and the contact members of the present invention generally require no additional assembly or adjustment at the place of use; since both the contact strips and the contact members are mounted internally to the measuring device, no external mounting apparatus is required to maintain the contact members in proper spatial relationship with respect to the contact strips. In addition, since both the contact strips and the contact members are positioned in the interior of the measuring device, they are protected both from fouling and and from damage.

The present invention, together with further objects and attendant advantages, will best be understood by reference to the following detailed description taken in connection with the accompanying drawings.

BRIEF DESCRIPTION OF THE DRAWINGS

FIG. 2 is a partial sectional view of a presently preferred embodiment of the measuring device of this invention.

FIG. 2a is an enlarged view of a portion of the measuring device of FIG. 2.

FIG. 3 is a plan view of the contact members and the insulating ring of the embodiment of FIG. 2.

FIG. 3a is a sectional view taken along line 3a—3a of FIG. 3.

DETAILED DESCRIPTION OF THE PREFERRED EMBODIMENTS

Figure 1A:
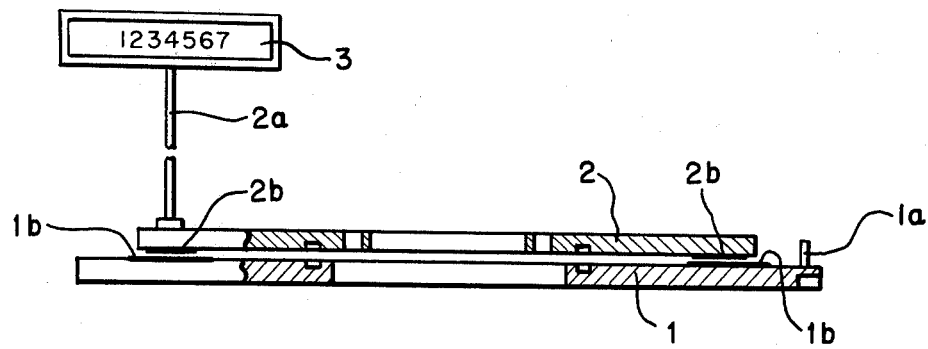
FIG. 1a is a sectional view of a trailing cable type inductive measuring device of the prior art.

Turning now to the drawings, FIG. 1a shows a prior art inductive angle-measuring device of the trailing cable type. This measuring device includes a stator 1 and a rotor 2. The stator 1 includes terminals 1a which are used to apply a supply voltage to the measuring device. Electrical conductors 1b,2b are mounted on the stator 1 and rotor 2, respectively. The rotor 2 is positioned adjacent the stator 1 to rotate about an axis such that the rotor conductor 2b is adjacent to and separated by an air gap from the stator conductor 1b. By reason of the conductors 1b,2b an electrical measurement voltage is induced in the conductor 2b, and the variations in this measurement voltage provide a measure of the relative movement between the rotor 2 and the stator 1. This measurement voltage is carried out of the rotor 2 by means of a trailing cable 2a. This cable 2a is connected to an evaluating unit 3 which operates to evaluate the measurement voltage and to display the angular position of the rotor 2 digitally. Because of the physical limitations of the trailing cable 2a, the angular movement between the stator 1 and the rotor 2 must generally be kept to a value less than 360°, because otherwise the trailing cable 2a would become twisted.

Figure 1B:
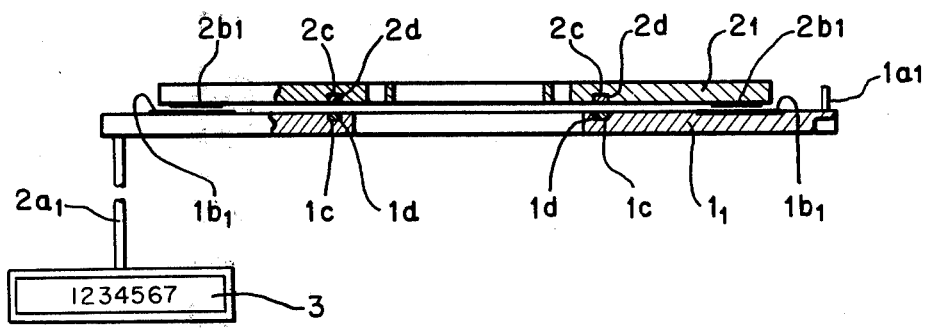
FIG. 1b is a sectional view of a transformer type inductive measuring device of the prior art.
Figure 1C:
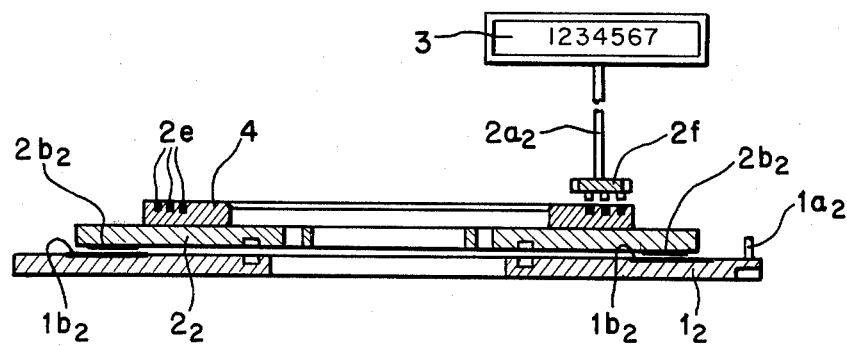
FIG. 1c is a sectional view of a slip ring type inductive measuring device of the prior art.

The prior art devices of FIGS. 1b and 1c are more versatile than the prior art device of FIG. 1a in that they are capable of measuring digital angles of greater than 360°. In the measuring device of FIG. 1b grooves $1c, 2c$ are provided in the stator $1_1$ as well as in the rotor $2_1$, respectively. In each of the grooves $1c, 2c$ a transformer winding $1d, 2d$, respectively, is placed. In the measuring device of FIG. 1b the supply voltage is applied to the measuring device by means of a connection $1a_1$, which is in turn coupled to the conductor $1b_1$ of the stator $1_1$.

As before, a measuring voltage is induced in the electrical conductor $2b_1$ of the rotor $2_1$. In this case, the conductor $2b_1$ is connected with the transformer winding $2d$, which is imbedded in the groove $2c$ of the rotor $2_1$. The second transformer winding $1d$ is positioned directly opposite the transformer winding $2d$ such that the two transformer windings $1d, 2d$ are separated by a slight gap. The second transformer winding $1d$ is imbedded in the groove $1c$ defined by the stator $1_1$. By means of the transformer formed of transformer windings $1d, 2d$, the measuring voltage is transmitted from the rotor $2_1$ to the stator $1_1$, and is then conducted from the transformer winding $1d$ of the stator $1_1$ to the connection $2a_1$, which is located in the stator $1_1$ and is connected with an evaluating unit 3 as in FIG. 1a.

In this manner the rotor $2_1$ is free to make an arbitrary number of revolutions with respect to the stator $1_1$. Because all cables are attached to the stator $1_1$ of the measuring device there is no danger of twisting cables. The device of FIG. 1b requires minimal installation space and is quite reliable in practice. However, because a transformer is used to transmit the measuring voltage from the rotor $2_1$ to the stator $1_1$ the transmission factor is substantially less than one and therefore the measuring voltage transmitted to the evaluating unit 3 is substantially lower in amplitude than in other types of measuring devices.

FIG. 1c represents an inductive measuring device having slip rings 2e and brushes 2f. This device is also capable of an arbitrarily large number of rotor revolutions. It also avoids the problems associated with the low transmission factor of the transformer type device of FIG. 1b. In the measuring device of FIG. 1c a terminal $1a_2$ is provided through which a supply voltage is applied to the measuring device. As previously explained in connection with FIGS. 1a and 1b, a measuring voltage is generated by means of electrical conductors $1b_2$ and $2b_2$ positioned on the stator $1_2$ and the rotor $2_2$, respectively. In this case an adaptor ring 4 is mounted on the back of the rotor $2_2$, and this adaptor ring 4 serves to mount a plurality of separate slip rings 2e. The measuring voltage is applied to these slip rings 2e. This measuring voltage is picked up by means of a plurality of brushes 2f which are mounted to rest on the slip rings 2e under spring bias. In general, these brushes 2f are mounted by the user of the measuring device so that the mounting and adjusting of the brushes 2f in a separate holder can be accomplished only at the place of final installation of the measuring device. The installation space for this type of device is in general greater than in the case of the previously described devices. In addition, the danger of damage and fouling of the external contacts $2f, 2e$ is relatively high because of their exposed position.

FIGS. 1a, 1b, 1c illustrate various devices of the prior art. In contrast, FIGS. 2, 2a, 3 and 3a illustrate a presently preferred embodiment of the present invention. Referring to FIG. 2, this embodiment includes a stator S which includes at its outer edge a connecting contact A by means of which a supply voltage is supplied to the measuring device. The stator S includes a stator division conductor ST which is electrically connected to the contact A. The stator S also defines a groove SN which is positioned on the conductor side of the stator and is concentric with an axis Z. An insulating ring IS is positioned inside this groove SN. The insulating ring IS, which is also represented in FIGS. 3 and 3a, carries a total of eight contact members or brushes $B_{11}-B_{14}$ and $B_{21}-B_{24}$, which in this preferred embodiment are constructed as contact springs. In order to increase the reliability of the electrical connection provided by the brushes $B_{11}-B_{24}$ the brushes $B_{11}-B_{24}$ are arranged into two concentric tracks, each of which includes four separate contact brushes $B_{11}-B_{14}$ and $B_{21}-B_{24}$, respectively, of differing lengths.

A rotor R is mounted opposite the stator S such that the rotor R and the stator S are separated by a small air gap and the rotor R is mounted to rotate with respect to the stator S about the axis Z. The rotor R includes a conductor side on which is mounted a scanning conductor RT, positioned opposite the division conductor ST of the stator S. In addition, the rotor R defines a groove RN on the conductor side thereof opposite the groove SN of the stator S. An insulating ring IR is mounted inside the rotor groove RN, and two concentric contact strips or slip rings $BS_1, BS_2$ are mounted on the insulating ring IR. The air gap between the stator S and the rotor R is matched to the contact spring lengths in such a way that the contact brushes $B_{11}-B_{14}$ and $B_{21}-B_{24}$ are constantly urged into contact with the slip rings $BS_1$ and $BS_2$, respectively. By means of the multiple contacts on each slip ring $BS_1, BS_2$ it is insured that even if one contact brush should provide unreliable contact, the measuring voltage can nevertheless be reliably transmitted from the rotor R to the stator S. The reliability of this connection is further enhanced by means of the differing spring constants of the respective brushes $B_{11}-B_{14}$ and $B_{21}-B_{24}$ by reason of their differing lengths.

The slip rings $BS_1$ and $BS_2$ are in electrical contact with the rotor scanning conductor RT. As previously described, a measuring voltage is induced in the rotor scanning conductor RT, which measuring voltage is conducted to the slip rings $BS_1$ and $BS_2$, is there picked up by the contact brushes $B_{11}-B_{14}$ and $B_{21}-B_{24}$, and is then fed by means of a connection M to an evaluating unit AE, in which the measuring signal is evaluated and processed to form a digital display.

Because both the brushes $B_{11}-B_{14}$ and $B_{21}-B_{24}$ and the slip rings $BS_1$ and $BS_2$ are internally mounted in the measuring device of FIG. 2 between the stator S and the rotor R, any damage or fouling of these elements is virtually excluded. In addition, the installation space required for the measuring device of FIG. 2 is substantially no greater than for other types of measuring devices. However, the transmission factor of the measuring device of FIG. 2 is substantially greater than the transmission factor of the transformer type of measuring device. Furthermore, the measuring device of FIG. 2 permits an arbitrarily large number of rotations of the rotor R with respect to the stator S.

A further advantage of the embodiment of FIG. 2 is that when the slip rings $BS_1$ and $BS_2$ and the contact brushes $B_{11}$–$B_{24}$ are arranged in concentric grooves SN and RN of the stator S and the rotor R it is possible to use the same stators S and rotors R for measuring devices of all three types (trailing cable, transformer and slip ring). This is because the grooves RN,SN are also well suited for the reception of transformer windings, as well as for the insulating rings IS,IR for the contact brushes $B_{11}$–$B_{24}$ and the slip rings $BS_1,BS_2$, respectively.

Particularly economical results are achieved if the contact brushes are formed by means of the stamp-bending process. If the required number of parts is too low to justify the high tool costs required for the stamp-bending process, very good results can be achieved by means of the etch-bending process.

The manufacture of the slip rings $BS_1$ and $BS_2$ is preferably carried out by means of the conductor plate etch technique.

Of course, it should be understood that various changes and modifications to the preferred embodiment described above will be apparent to those skilled in the art. For example, the invention is not limited to the particular type of slip rings and contact brushes described above. Furthermore, the slip rings may be mounted on the stator and the contact brushes on the rotor. It should be understood that the foregoing description is intended merely to illustrate the presently preferred embodiment of the invention, and not to limit the scope of this invention, which is defined by the following claims, including all equivalents.

We claim:

1. In an inductive angle measuring device comprising a stator having an electrically conductive division conductor mounted on a conductor side thereof, a rotor having an electrically conductive scanning conductor mounted on a conductor side thereof, wherein the rotor is mounted to rotate with respect to the stator about an axis and the division conductor is positioned adjacent to and separated by a gap from the scanning conductor, the improvement comprising:
   a pair of annular slip rings mounted on the conductor side of the rotor, concentric with the axis, and electrically connected with the scanning conductor;
   a plurality of circumferentially spaced contact springs differing in length, one to another, mounted on the conductor side of the stator, opposite the slip rings such that at least one of the plurality of contact springs is in electrical contact with each of the slip rings, said contact springs being electrically connected with the evaluating circuit;
   said slip rings and contact springs cooperating to transmit measuring signals developed in the scanning conductor from the rotor to the evaluating circuit.

2. In an inductive angle measuring device comprising a stator having an electrically conductive division conductor mounted on a conductor side thereof, a rotor having an electrically conductive scanning conductor mounted on a conductor side thereof, wherein the rotor is mounted to rotate with respect to the stator about an axis and the division conductor is positioned adjacent to and separated by a gap from the scanning conductor, the improvement comprising:
   a plurality of circumferentially spaced contact springs differing in length, one to another, mounted on the conductor side of the rotor and electrically connected with the scanning conductor; and
   a pair of annular slip rings mounted on the conductor side of the stator, concentric with the axis opposite the contact springs such that at least one of the contact springs is in electrical contact with each of the slip rings, said slip rings being electrically connected with the evaluating circuit;
   said contact springs and slip rings cooperating to transmit measuring signals developed in the scanning conductor from the rotor to the evaluating circuit.

3. In an electrical digital angle measuring device comprising a first component and a second component, each of said first and said second components defining a conductor side, wherein one of the two components is a stator having an electrically conductive measuring division conductor mounted on the conductor side thereof, and the other of the two components is a rotor having an electrically conductive scanning conductor mounted on the conductor side thereof, and wherein the rotor is mounted to move relative to the stator and the division conductor is positioned adjacent to and separated by a gap from the scanning conductor, the improvement comprising:
   at least one electrically conductive contact strip mounted on the conductor side of the first component; and
   a plurality of circumferentially spaced electrically conductive contact members mounted on the conductor side of the second component such that each contact member is in electrical contact with the contact strip, each of said plurality of contact members comprising a contact spring which is spring biased toward the contact strip.

4. The invention of claim 3 wherein said contact springs are produced by means of an etch-bending process.

5. The invention of claim 3 wherein said contact springs are produced by means of a stamp-bending process.

6. The invention of claim 3 wherein the rotor is mounted to rotate with respect to the stator about an axis, and wherein the at least one contact strip comprises at least one annular slip ring positioned concentrically about the axis.

7. The invention of claim 6 wherein the second component defines an annular groove in the conductor side thereof, concentric with the axis, and wherein said plurality of contact members are mounted in the groove.

8. The invention of claim 6 wherein the rotor defines an annular groove in the conductor side thereof, concentric with the axis, and the at least one slip ring is mounted in the rotor groove, and wherein the stator defines an annular groove in the conductor side thereof, concentric with the axis, and said plurality of contact members are mounted in the stator groove.

9. The invention of claim 6 wherein the rotor defines an annular groove in the conductor side thereof, concentric with the axis, and said plurality of members are mounted in the rotor groove, and wherein the stator defines an annular groove in the conductor side thereof, concentric with the axis, and the at least one slip ring is mounted in the stator groove.

10. In an electrical digital angle measuring device comprising a first component and a second component, each of said first and said second components defining a conductor side, wherein one of the two components is a stator having an electrically conductive measuring division conductor mounted on the conductor side thereof, and the other of the two components is a rotor having an electrically conductive scanning conductor mounted on the conductor side thereof, and wherein the rotor is mounted to move relative to the stator and the division conductor is positioned adjacent to and separated by a gap from the scanning conductor, the improvement comprising:

at least one electrically conductive contact strip mounted on the conductor side of the first component; and a plurality of electrically conductive contact members mounted on the conductor side of the second component such that each contact member is in electrical contact with the contact strip, each of said plurality of contact members comprising a contact spring which is spring biased toward the contact strip, the plurality of contact springs differing in length, one to another.

11. The invention of claim 10 wherein the rotor is mounted to rotate with respect to the stator about an axis, and wherein the at least one contact strip comprises at least one annular slip ring positioned concentrically about the axis.

* * * * *